United States Patent
Kazmi et al.

(10) Patent No.: US 9,237,532 B2
(45) Date of Patent: *Jan. 12, 2016

(54) E-UTRAN AND HANDOVER

(71) Applicant: Telefonaktiebolaget L M Ericsson (publ), Stockholm (SE)

(72) Inventors: Muhammad Kazmi, Bromma (SE); Robert Baldemair, Solna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/169,098

(22) Filed: Jan. 30, 2014

(65) Prior Publication Data
US 2014/0198769 A1    Jul. 17, 2014

Related U.S. Application Data

(63) Continuation of application No. 12/673,453, filed as application No. PCT/SE2007/050542 on Aug. 10, 2007, now Pat. No. 8,676,201.

(51) Int. Cl.
*H04W 52/40* (2009.01)
*H04W 36/30* (2009.01)
*H04W 36/00* (2009.01)
*H04W 74/08* (2009.01)

(52) U.S. Cl.
CPC .......... *H04W 52/40* (2013.01); *H04W 36/0016* (2013.01); *H04W 36/0077* (2013.01); *H04W 36/30* (2013.01); *H04W 74/0833* (2013.01); *H04W 74/0866* (2013.01)

(58) Field of Classification Search
CPC ..... H04W 36/00; H04W 36/08; H04W 52/40; H04W 52/242; H04W 52/146; H04W 36/0016; H04W 74/0833; H04W 36/30; H04W 88/08; H04W 48/12; H04W 74/006; H04W 52/367; H04W 92/20; H04W 36/0061; H01L 41/0609
USPC .................... 455/436–445; 370/331
See application file for complete search history.

(56) References Cited

U.S. PATENT DOCUMENTS 6,496,531 B1 * 12/2002 Kamel et al. .................. 375/130
6,535,723 B1 *  3/2003 Jiang et al. .................. 455/245.1

(Continued)

FOREIGN PATENT DOCUMENTS

CN          1596020 A     3/2005

OTHER PUBLICATIONS

International Search Report for PCT/SE2007/050542, mailed Jun. 10, 2008.

(Continued)

*Primary Examiner* — Nizar Sivji
(74) *Attorney, Agent, or Firm* — Baker Botts, LLP

(57) ABSTRACT

The present invention relates to a method, a base station and an interface for handover in a wireless communication network. Handover is initiated when the signal quality falls below a predetermined value. Random access serves as an uplink procedure to enable the UE to make handover from a first base station (eNodeB) to a suitable second base station (eNodeB). In the present invention, random access parameters are exchanged between second and first base station before said first base station signals said random access parameters to said user equipment.

16 Claims, 2 Drawing Sheets

TRANSMITTING RANDOM ACCESS PARAMETERS BETWEEN FIRST BASE STATION (SOURCE BASE STATION) AND SECOND BASE STATION (TARGET BASE STATION)    2-1

SIGNALING THE RANDOM ACCESS PARAMETERS FROM THE FIRST BASE STATION TO USER EQUIPMENT FOR USE IN HANDOVER    2-2

(56) References Cited

U.S. PATENT DOCUMENTS

| | | | |
|---|---|---|---|
| 8,457,640 | B2 | 6/2013 | Du |
| 2007/0147310 | A1 | 6/2007 | Cai |
| 2009/0047962 | A1* | 2/2009 | Rao ............................... 455/437 |
| 2010/0210297 | A1* | 8/2010 | Simonsson et al. ........... 455/522 |
| 2010/0278143 | A1 | 11/2010 | Chun et al. |
| 2010/0279601 | A1* | 11/2010 | Phan et al. ........................ 455/7 |
| 2013/0281093 | A1* | 10/2013 | Jung et al. ...................... 455/436 |
| 2014/0179328 | A1* | 6/2014 | Bala et al. ...................... 455/450 |

OTHER PUBLICATIONS

Fujitsu: "R1-062893, R1-062886 Random Access for less-contention-based handover", 3GPP TSG-RAN-WG1 Meeting #46Bis, 3GPP TSG-RAN-WG2 Meeting #55, [Online], (Oct. 9-13, 2006).

3GPP TS 36.213 V1.2.0, $3^{rd}$ Generation Partnership Project, Physical layer procedures (Release 8), Section 6, (May 2007), [Online].

3GPP TS 36.300 V8.1.0, $3^{rd}$ Generation Partnership Project, Overall description; Stage 2 (Release 8), (Jun. 2007), [Online].

Siemens, "TDOC R1-061041 Power Control for E-UTRA Random Access and TP", 3GPP TSG-RAN WG1 #44bis, (Mar. 2006), [Online].

3GPP TR 25.813 V7.0.0, $3^{rd}$ Generation Partnership Project, Radio Interface Protocol Aspects (Release 7), (Jun. 2006), [Online].

Texas Instruments, "R1-072838 Random Access Preamble L1 Parameters in E-UTRA", 3GPP TSG RAN WG1 #49Bis, (Jun. 25-29, 2007), [Online].

Chinese Office Action and English translation thereof mailed Aug. 3, 2012 in Chinese Patent Application 200780100201.7.

Decision on Rejection issued by the State Intellectual Property Office, P.R. China for Patent Application No. 200780100201.7, Aug. 6, 2014.

* cited by examiner

E-UTRAN AND HANDOVER

This application is a continuation of U.S. patent application Ser. No. 12/673,453 filed Feb. 12, 2010, which is the U.S. national phase of International Application No. PCT/SE2007/050542 filed Aug. 10, 2007, which designated the U.S., the entire contents of which is hereby incorporated by reference.

BACKGROUND

The technology disclosed herein relates to a method, base station, interface for handover in a wireless communication network which include at least a first base station (eNodeB) and at least one user equipment where handover initiates when the signal quality falls below a predetermined value and where random access parameters serves as an uplink procedure to enable the UE to make handover to a suitable second base station (eNodeB).

When a mobile phone is moving, it will be traveling through different cells. If the mobile phone is not engaged in a call, it will tell the network every now and then that it has moved to another cell. If the mobile phone is engaged in a call, the call of course needs to be maintained while the phone is moving. The process of replacing communication with one cellular radio station with another is called handover. When the cellular network sees the mobile phone moving closer and closer to another cell, it will initiate the handover process, during which the call will be transferred from one cellular radio station to another.

In WCDMA the handover access is done via dedicated channel. The dedicated channel uses closed loop fast power control. At the time of handover the RNC signals the initial UL DPCCH power setting parameter to the UE. This value is used by the UE to derive its initial uplink power for radio link that is to be added at the target cell. Since power control is in operation therefore uplink physical layer synchronization of the new radio link can be achieved quickly.

In the downlink of the mobile communication system LTE or E-UTRAN the modulation format is OFDM (Orthogonal Frequency Division Multiplex) for the signal bearer and the access scheme is OFDMA (Orthogonal Frequency Division Multiple Access). In the uplink of LTE, a slightly different multiple access scheme called single carrier frequency division multiple access (SC-FDMA) is used.

The actual implementation of the technology is different between the downlink (i.e. from base station to mobile) and the uplink (i.e. mobile to the base station) as a result of the different requirements between the two directions and the equipment at either end.

One fundamental difference between UTRAN and E-UTRAN in terms of handover procedure is that in the latter system the UE during the handover access the target cell via normal RACH channel (3). In UTRAN the UE is assigned a dedicated channel during handover. This implies that in E-UTRAN it is important that the UE transmits RACH in the neighbour cell with the correct transmit power level and at the correct frame or sub-frame boundary. In order to allow UE to correctly estimate the RACH transmit power the source cell should provide power control and RACH format related parameters, which are applicable to the target cell. Furthermore these parameters should be conveyed to the UE prior to the initiation of handover.

There are two main issues in the existing system as discussed below:

In WCDMA the handover access is done via dedicated channel. The dedicated channel uses closed loop fast power control. At the time of handover the RNC signals the initial UL DPCCH power setting parameter to the UE. This value is used by the UE to derive its initial uplink power for radio link that is to be added at the target cell. Since power control is in operation therefore uplink physical layer synchronization of the new radio link can be achieved quickly.

In E-UTRAN Orthogonal Frequency Division Multiple Access (OFDMA) technology is used in the downlink. OFDM is a modulation scheme in which the data to be transmitted is split into several sub-streams, where each sub-stream is modulated on a separate sub-carrier. Hence in OFDMA based systems, the available bandwidth is sub-divided into several resource blocks or units where a resource block is defined in both time and frequency. According to the current assumptions, a resource block size is 180 KHz and 0.5 ms in frequency and time domains, respectively. The overall uplink and downlink transmission bandwidth can be as large as 20 MHz.

For the LTE uplink, a different concept is used for the access technique. Although still using a form of OFDMA technology, the implementation is called Single Carrier Frequency Division Multiple Access (SC-FDMA). In essence a mobile is allocated a sub-carrier or sub-carriers for its link to the base station and it uses these to establish the uplink.

In E-UTRAN the handover access will take place via RACH, which cannot use and will not use fast power control. This means RACH transmission power during handover access should be as precise as possible. In general the handover access on RACH should use the correct setting, parameters and power levels. This requires some exchange of information related to RACH between eNode B. In the current WCDMA system no such information is exchanged. If such information is not exchanged between eNodeBs in LTE the uplink synchronization will be delayed. Secondly the collision on RACH may also increase. Thirdly the interference will increase due to increase in RACH load. Furthermore, if the serving and target cells use different RACH format then handover access to the target cell may completely fail if the UE accesses the target cell with the RACH format used in the serving cell. An alternative and straight forward solution is that prior to handover access the UE reads system information of the neighbour cells to acquire all RACH related information of the neighbour cell. The obvious disadvantage is that it will increase the handover delay and interruption time. Another problem is that it will increase complexity in the UE due to reading of neighbour cell information in RRC_CONNECTED mode.

SUMMARY

According to a first aspect of the technology disclosed herein, there is provided a method for handover in a wireless communication network which include at least a first base station (eNod B) and at least one user equipment where handover initiates when the signal quality falls below a predetermined value and where random access parameters serves as an uplink procedure to enable the UE to make handover to a suitable second base station (eNodeB).

said random access parameters exchanged between first and second base station before said first base station signalling said random access parameters to said user equipment (UE).

said signalling takes place before or at the time said user equipment performs handover in connected mode to said second base station.

said random access related parameters are exchanged over X2 interface between the base stations in LTE.

said wherein the said set of RACH related parameters exchanged between the base stations correspond to RACH channel format, RACH power control, RACH access control, RACH burst construction.

said parameters correspond to Uplink interference, RACH persistence level, backoff control parameters, SNR target level, reference symbol transmitted power, Zadoff-Chu root sequence index, cyclic shift information, high speed flag, time-frequency allocation of RACH slot, offset for uplink and downlink imbalance.

According to a second aspect of the technology disclosed herein, there is a base station (eNod B) communication with at least one user equipment where handover initiates when the signal quality falls below a predetermined value and where random access parameters serves as an uplink procedure to enable the UE to make handover to a suitable second base station (eNod B) where said random access parameters transmits between first and second base station before said first base station signalling said random access parameters to said user equipment (UE).

According to a third aspect of the technology disclosed herein, there is a user equipment, in communication with a first base station, where handover initiates when the signal quality falls below a predetermined value and where random access parameters serves as an uplink procedure to enable the UE to make handover to a suitable second base station (eNod B) where said random access parameters transmits between first and second base station before said first base station signalling said random access parameters to said user equipment (UE).

According to a third aspect of the technology disclosed herein, there is a interface (x2) between base stations in LTE where A user equipment, in communication with a first base station, where handover initiates when the signal quality falls below a predetermined value and where random access parameters serves as an uplink procedure to enable the UE to make handover to a suitable second base station (eNod B) where said random access parameters transmits between first and second base station before said first base station signalling said random access parameters to said user equipment (UE).

Advantages of the technology disclosed herein is that we get an improved handover access via RACH and that Uplink synchronization via RACH to the target cell will be faster leading to shorter interruption time. UE does not have to read system information of the target cell to acquire RACH related parameters. This leads to less complexity in the UE. The idea of exchanging RACH related parameters and measured quantities is applicable to any other system where handover access to the destination cell takes place via RACH. However, some of the parameters to be exchanged would be specific to that particular technology.

BRIEF DESCRIPTION OF THE DRAWINGS

Embodiments of the technology disclosed herein will now be described, by way of example, with reference to the accompanying drawings, in which.

DETAILED DESCRIPTION

A glossary of the abbreviations used in this patent specification is set out below to facilitate an understanding of the present invention.

E-UTRAN: Evolution UMTS Terrestrial Radio Access Network=LTE (Long Term Evolution)
OFDM: Orthogonal Frequency Division Modulation
OFDMA: Orthogonal Frequency Division Multiple Access
RS: Reference Signal
AGW Access Gateway
eNode B Enhanced Node B
RACH Random Access Channel
SC-FDMA Single Carrier FDMA
UE User Equipment
SCH: Synchronization Signal
UE: User Equipment
CPICH: Common Pilot Indication Channel
FDD: Frequency division duplex
WCDMA: Wide band code division multiple access.

Figure 1:
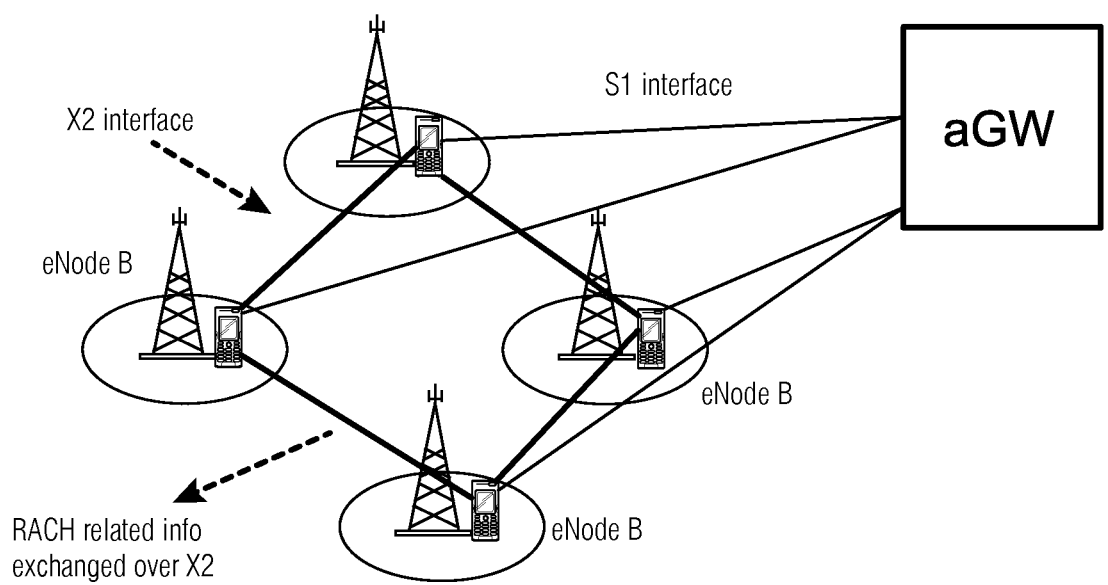
FIG. 1 illustrates the RACH related information to be exchanged over X2 interface (between eNode Bs).

FIG. 1 shows architecture of a radio network in which the technology disclosed herein may be implemented. An access gateway (aGW) is connected to several enhanced node Bs (eNode Bs). The interface between aGW and eNode B is called the Si interface and the interface that exists between eNodes is called X2 interface. RACH related information is exchanged over the X2 interface of FIG. 1

In a typical cellular radio system, a geographical area is divided into cell areas served by base stations which are connected to a radio network. Each user (mobile subscriber) in the cellular radio system is provided with a portable, hand-held, mobile station (user equipment unit or UE) which communicates voice and/or data with the mobile radio network. Each base station includes a plurality of channel units including a transmitter, a receiver, antennas etc. Each user equipment unit (UE) also includes a transmitter, a receiver, antenna, user interface and is identified by a specific user equipment unit (UE) identifier.

In a cellular radio communications system, a handover operation allows an established radio connection to continue when a mobile radio participating in that connection moves between cells in the system. Handover is typically initiated when the signal strength or signal quality of the radio connection with an origination base station falls below a predetermined threshold value. Often, a low signal strength or a poor signal quality indication means that the user equipment unit (UE) is near a border between the two cells. If the user equipment unit (UE) moves closer to a destination cell or to a clearer line of unobstructed sight, handover of the radio connection to the destination cell usually results in improved radio transmission and reception. Deciding which cells to involve in handover often requires coordination between the user equipment unit (UE) and the radio network. For example, in Wideband CDMA (WCDMA), the user equipment unit (UE) maintains a list of cells to monitor for potential handover purposes. The list of cells maintained by the user equipment unit (UE) includes cells comprising an "active list", as well as adjacent cells which (although not in the active list) are to be monitored. The user equipment unit (UE) continuously updates its list of cells to monitor based on information communicated to the user equipment unit (UE) by the network. For example, the network may provide, via a message such as a measurement control message, an initial list of cells via a message such as a measurement control message. The initial list of cells may be, for example, a list of cells which neighbor the cell in which the user equipment unit (UE) is located. Thereafter the network may update the user equipment unit (UE) regarding what cells should be included in the active set using a message such as an active set update message.

The user equipment unit (UE) monitors, e.g., makes measurements regarding, the base station control or broadcast channel of each of the cells included in the list maintained by the user equipment unit (UE). The monitoring results (e.g., measurements) are transmitted to the network where, based on this monitoring, the network makes a determination as to what cells should be in the active set (e.g., what cells should be added, replaced, or removed).

Different types of control channels may exist between one of the base stations and user equipment units (UEs). For example, in the forward or downlink direction, there are several types of broadcast channels including a general broadcast channel (BCH), a paging channel (PCH), a common pilot channel (CPICH), and a forward access channel (FACH) for providing various other types of control messages to user equipment units (UEs). In the reverse or uplink direction, a random access channel (RACH) is employed by user equipment units (UEs) whenever access is desired to perform location registration, call origination, page response, and other types of access operations. The random access channel (RACH) is also used for carrying certain user data, e.g., best effort packet data for, e.g., web browser applications. Traffic channels (TCH) may be allocated to carry substantive call communications with a user equipment unit (UE).

When a UE shall make access to an E-UTRAN radio network, the UE seeks access to the network in order to register and commence services. The random access (RA) serves as an uplink control procedure to enable the UE to access the network.

Random access in E-UTRAN is based on a two-step procedure. In the first step the UE transmits a randomly selected signature to the network. In the subsequent procedure the network responds to the UE with an uplink scheduling grant which is used by the UE to transmit further details related to the connection request.

The transmitted sequence is randomly chosen out of an available pool of 64 unique sequences. If the UE does not receive an uplink scheduling grant within a certain time it randomly selects a new signature sequence and performs a new random access (RA) attempt.

The time-frequency resources where random access can be performed are announced via system information. One random access opportunity (or resource) is 1.07 MHz wide (6 resource blocks) and lasts either for 1 ms or 2 ms, depending on the RACH preamble format. Multiple RA opportunities may be spread out over frequency. It is up to the network whether to schedule other data in a RA slot or not. The network thus also controls whether RA transmission is orthogonal to shared data transmission or not.

RACH Format and Associated Parameters. The RACH burst in LTE contains a cyclic prefix, the RACH preamble, and a guard interval. The cyclic prefix is in the beginning of the RACH burst and is a copy of the last part of the RACH preamble. The cyclic prefix enables efficient frequency-domain processing of the RACH burst in the eNode B RACH receiver. The guard interval accounts for the unknown round trip delay in the cell. Both cyclic prefix and guard interval must be larger then the maximum round trip delay to ensure proper operation.

The LTE standard defines 3 RACH preamble formats:

1. Standard format, 1 ms: The preamble part of the RACH burst is not repeated. The cyclic prefix and guard period are balanced and enable cell sizes of approximately 15 km (only considering round trip delay, not link budget).

2. Format with extended cyclic prefix, 2 ms: This format provides extended cyclic prefix and guard periods but no repetition of the preamble. The cyclic prefix and guard period are balanced and enable cell sizes of approximately 80 to 90 km (only considering round trip delay, not link budget).

3. Repeated preamble format: The preamble is repeated to enable a higher received energy at the receiver.

The RACH preamble is derived from Zadoff-Chu root sequences. These sequences have ideal periodic auto-correlation functions and given this auto-correlation also best possible periodic cross-correlation functions. Depending on the cell size multiple RACH preambles can be derived from a single Zadoff-Chu root sequence: In addition to the root Zadoff-Chu sequence—which is always a valid RACH preamble—additional preambles can be derived by cyclic shifting the Zadoff-Chu root sequence integer multiples of the minimum shift amount. This minimum shift amount depends on the cell size and must be at least as large as the maximum round trip delay plus maximum expected delay spread in the cell. This condition together with the ideal auto-correlation function insures that a RACH preamble transmitted with a certain cyclic shift never creates a correlation peak in a zone associated with another cyclic shift, all RACH preambles derived from a single Zadoff-Chu root sequence are orthogonal.

If the cell size becomes too large not all required 64 preambles can be derived from a single Zadoff-Chu root sequence, in this case additional root sequences needs to be allocated. Preambles derived from different root sequences are not mutual orthogonal.

Information that must be conveyed to a terminal is the Zadoff-Chu root sequence together with the minimum cyclic shift value. These two information elements enable a terminal to construct a RACH preamble. Even in case that a single Zadoff-Chu root sequence is not sufficient this information is sufficient since the terminal can calculated how many root sequences are needed and pick them according to a predefined order.

In case of cells where terminals with high speeds are expected not all cyclic shift values are allowed. In this case one-bit information is required to signal this.

The parameters describing the preamble (Zadoff-Chu root sequence, minimum cyclic shift value and high speed flag) together with the RACH format enable the terminal to construct the RACH burst. In addition to these parameters some additional information is required by the UE to know when and at which frequency to transmit the RACH burst, i.e. information regarding the allocation of the RACH slot is also needed.

RACH Configuration in Different Cells. Each cell will use only one type of RACH format. The format selection is implementation dependent. Generally it would depend upon the cell size, desired coverage etc. However, adjacent cells may use different RACH formats since cell coverage may vary in the same deployment area. Secondly, the network planning can change in static or semi-dynamic manner, which would require change in the RACH format. The parameters associated with the RACH format shall be signaled in the cell via system information.

RACH Transmitted Power Estimation.

The open loop power control is used by the UE to estimate the power with which it transmits RACH pre-amble. The estimation is based on downlink path loss and uplink interference measured at the base station. The RACH preamble transmission power ($P_{RACH}$) is described below:

Assume that a UE transmits with certain power level such that the signal received at the base station achieves certain $SNR_r$, which can be expressed as follows in linear scale by (1):

$$SNR_t = \frac{P_{RACH} \times g_{UL}}{I_{UL} \times N_0} \quad (1)$$

$g_{UL}$: is uplink path gain
$I_{UL}$: is uplink received interference
$N_0$: is white noise The above equation can be expressed in dB scale as follows:

$$P_{RACH} = SNR_t + (I_{UL} + N_O) - g_{UL} [\text{dBm}] \quad (2)$$

In (2) all variables are unknown. The quantities $SNR_t$ and $I_{UL}$ can be signaled to the UE via system information. However, the third variable $g_{UL}$ can be estimated from the downlink measurement quantity called reference symbol received power (RSRP), which is specified in E-UTRAN, as follows:

$$RSRP = P_{RS} - g_{gl} [\text{dBm}] \quad (3)$$

Note (3) contains downlink path gain ($g_{DL}$), whereas the goal is to estimate the uplink path gain ($g_{UL}$); the above relation can be rewritten as follows:

$$g_{DL} = P_{RS} - RSP \; [DB] \quad (4)$$

$P_{RS}$: is reference symbol transmission power

The relation between uplink and downlink path gain can be expressed as follows by applying cell specific offset ($\delta$) to account for uplink/downlink imbalance, feeder losses etc. Thus, UE can derive uplink path gain ($g_{UL}$) from the downlink path gain as follows:

$$g_{UL} = P_{RS} - RSP + \delta \; [\text{dBm}] \quad (5)$$

Combining (2) and (5) we can express the derived RACH transmitted power as follows:

$$P_{RACH} = SNR_t + (I_{UL} + N_O) - P_{RS} + RSRP - \delta [\text{ dBm}] \quad (6)$$

This is state of the art method of deriving RACH transmitted power. Similar method is also used in WCDMA.

It is evident from (6) that in order to facilitate the UE to derive initial RACH transmission power the network has to signal the following parameters:

Target signal to noise ratio ($SNR_t$)
Uplink received interference ($I_{UL}$)
Reference symbol transmitted power ($P_{RS}$)
Cell specific offset ($\delta$)

The derivation of initial RACH power based on signaled parameters is commonly referred to open loop power control.

The above parameters are cell specific and are signaled to the UE via system information in WCDMA. These information elements except cell specific offset are not exchanged between the cells in the state of the art technologies. As discussed below some of these parameters are to be exchanged over X2 interface (i.e. eNode B-eNode B interface) in E-UTRAN.

In a E-UTRAN network a UE shall receive a handover command via the serving cell. The command will indicate to the UE the target cell, where it should perform the handover. The UE sends RACH in the target cell. In order to attain uplink synchronization quickly the serving cell provides all necessary RACH related parameters in the handover command. The aim of this technology disclosed herein is to exchange some of these parameters between the eNodeBs, as shown in act 2-1 of FIG. 2.

Figure 2:
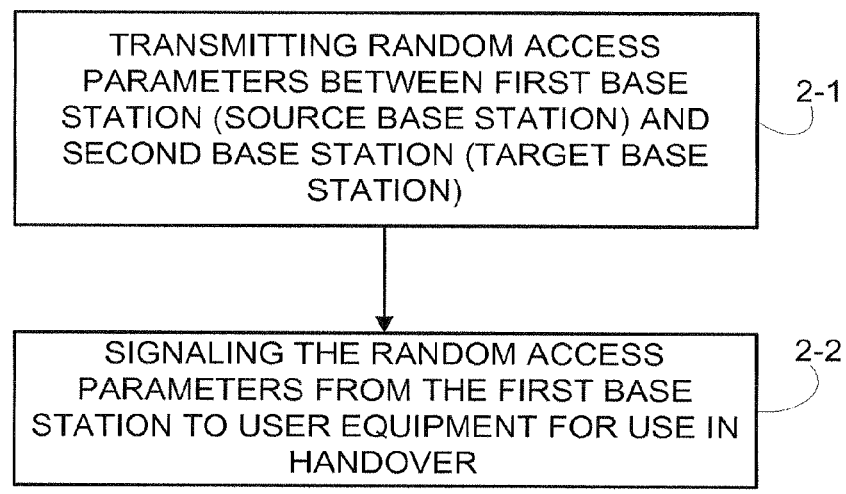
FIG. 2 is a flowchart showing basic acts performed in a method of transmitting random access parameters between base stations before signaling the random access parameters to a user equipment for use in handover.

These parameters are cell specific. The signaling of these parameters to the neighbour eNode B enables each eNode B to be aware of the RACH related status, parameters and information in its neighbour cells. Act 2-2 of FIG. 2 shows subsequent signaling of the random access parameters from the source base station node to the user equipment unit.

This information can be classified into two main categories:

Dynamic Information
Semi-static information
Dynamic Information to be Exchanged Over X2.

By dynamic information is meant information that can vary in the order of few 100 ms duration or shorter. This dynamic information can be signaled either periodically, when requested by the source cell or when decided by the destination cell. This dynamic information is mainly related to RACH power control but there can be other cases as well. Examples are shown in table 1.

Semi-static Information to be exchanged over X2

Semi-Static type of information is exchanged when the RACH format is changed in the cell. This is either due to change in cell planning or because of any other purpose depending upon the implementation. But most common signalling scenarios would be when decided by the destination cell or when there is request from the source cell. In principle these parameters can also be signaled periodically. Examples of such information are shown in table 2.

Some of the information listed in table 2 could also be configured in each eNode B via operational and maintenance (O&M) or by any other propriety interface.

In addition the classification of information in table 1 and table 2 into dynamic or semi-static respectively is just one typical example. In practice this may be a matter of implementation in the network. For example in another implementation especially if uplink load is low the uplink interference may be exchanged in semi-static manner.

In order to ensure better interoperability between eNode B, which may be belong to different vendors, preferably these parameters are set by each eNode B itself and eventually communicated to its neighbours. This means preferably they should be signalled via X2 interface (i.e. interface between the eNode B).

The technology disclosed herein being thus described, it will be obvious that the same may be varied in many ways. Such variations are not to be regarded as a departure from the spirit and scope of the technology disclosed herein, and all such modifications as would be obvious to one skilled in the art are intended to be included within the scope of the following claim.

TABLE 1

| Dynamic Information | |
| --- | --- |
| Information Element | Purpose |
| Uplink interference | RACH power control |
| RACH load/persistence probability | RACH access |

TABLE 2

| Semi-static information | |
| --- | --- |
| Information Element | Purpose |
| RACH format (0, 1, 2) | Overall status |
| $SNR_t$ | |
| Reference symbol transmitted power | RACH power control |
| Zadoff-Chu root sequence index | RACH burst construction |
| Cyclic shift information | RACH burst construction |

TABLE 2-continued

Semi-static information

| Information Element | Purpose |
| --- | --- |
| High speed flag | RACH burst contruction |
| Time-frequency allocation of RACH slot | RACH access |
| Offset for UL/DL imbalance | RACH power control |

What is claimed is:

1. A method of operating a wireless communication network which includes a source base station and a target base station, the method comprising:
 exchanging between the source base station and the target base station a random access channel (RACH) power control parameter to be used by a user equipment for determining a transmission power with which the user equipment transmits a RACH transmission;
 the user equipment using the RACH power control parameter for requesting access to the wireless communications network; and
 wherein the exchange between the source base station and the target base station comprises the target base station sending the RACH power control parameter to the source base station before the source base station signals a random access parameter to the user equipment in conjunction with a handover of the user equipment to the target base station.

2. The method of claim 1, further comprising exchanging the RACH power control parameter over an X2 interface between the source base station and the target base station in a Long Term Evolution (LTE) radio access network.

3. The method of claim 1, wherein the source base station serves a source cell and the target base station serves a target cell.

4. The method of claim 3, further comprising signalling the RACH power control parameter before or at the time said user equipment performs handover in connected mode to the target base station.

5. The method of claim 1, further comprising periodically exchanging the RACH power control parameter between the source base station and the target base station.

6. The method of claim 1, further comprising exchanging the RACH power control parameter between the source base station and the target base station at a request of one of the source base station and the target base station.

7. The method of claim 1, further comprising also exchanging between the source base station and the target base station one or more of the following other random access parameters: RACH channel format, RACH access control, RACH burst construction.

8. The method of claim 1, further comprising also exchanging between the source base station and the target base station one or more of the following other random access parameters: Uplink interference, RACH persistence level, backoff control parameters, SNR target level, reference symbol transmitted power, Zadoff-Chu root sequence index, cyclic shift information, high speed flag, time-frequency allocation of RACH slot, offset for uplink and downlink imbalance.

9. A target base station node of a wireless communication network comprising:
 one or more processors and memory, the memory containing instructions executable by the one or more processors, whereby the one or more processors are operable to:
 exchange with a source base station node of the wireless communication network a random access channel (RACH) power control parameter to be used by a user equipment for determining a transmission power with which the user equipment transmits a RACH transmission for requesting access to the wireless communications network; and
 wherein the target base station is configured to send the RACH power control parameter to the source base station before the source base station signals a random access parameter to the user equipment in conjunction with a handover of the user equipment to the target base station.

10. The target base station node of claim 9, wherein the wireless communication network is a Long Term Evolution (LTE) radio access network and wherein the target base station node is configured to exchange the RACH power control parameter over an X2 interface of the Long Term Evolution (LTE) radio access network.

11. The target base station node of claim 9, wherein the source base station node serves a source cell and the target base station node serves a target cell.

12. The target base station node of claim 11, wherein the target base station node is configured to signal the RACH power control parameter before or at the time said user equipment performs handover in connected mode to the target base station node.

13. The target base station node of claim 9, wherein the target base station node is configured to periodically exchange the RACH power control parameter with the source base station node.

14. The target base station node of claim 9, wherein the target base station node is configured to exchange the RACH power control parameter at a request of one of the target base station node and the source base station node.

15. The target base station node of claim 9, wherein the target base station node is configured to also exchange with the source base station node one or more of the following other random access parameters: RACH channel format, RACH access control, RACH burst construction.

16. The target base station node of claim 9, wherein the target base station node is configured to also exchange with the source base station node one or more of the following other random access parameters: Uplink interference, RACH persistence level, backoff control parameters, SNR target level, reference symbol transmitted power, Zadoff-Chu root sequence index, cyclic shift information, high speed flag, time-frequency allocation of RACH slot, offset for uplink and downlink imbalance.

* * * * *

UNITED STATES PATENT AND TRADEMARK OFFICE
CERTIFICATE OF CORRECTION

PATENT NO. : 9,237,532 B2
APPLICATION NO. : 14/169098
DATED : January 12, 2016
INVENTOR(S) : Kazmi et al.

Page 1 of 2

It is certified that error appears in the above-identified patent and that said Letters Patent is hereby corrected as shown below:

In the specification

In Column 1, Line 6, delete "2007," and insert -- 2007, now Pat. No. 8,676,201, --, therefor.

In Column 2, Line 54, delete "(eNod B)" and insert -- (eNode B) --, therefor.

In Column 3, Line 12, delete "(eNod B)" and insert -- (eNode B) --, therefor.

In Column 3, Line 16, delete "(eNod B)" and insert -- (eNode B) --, therefor.

In Column 3, Lines 25-26, delete "(eNod B)" and insert -- (eNode B) --, therefor.

In Column 3, Line 36, delete "(eNod B)" and insert -- (eNode B) --, therefor.

In Column 4, Line 22, delete "Si interface" and insert -- S1 interface --, therefor.

In Column 4, Line 24, delete "FIG. 1" and insert -- FIG. 1. --, therefor.

In Column 5, Line 58, delete "larger then" and insert -- larger than --, therefor.

In Column 7, Lines 1-4, delete " $SNR_i = \dfrac{P_{RACH} \times g_{UL}}{I_{UL} + N_0}$ " and insert -- $SNR_i = \dfrac{P_{RACH} \times g_{UL}}{I_{UL} + N_0}$ --, therefor.

In Column 7, Line 7, delete "$N_0$: is white noise" and insert -- $N_O$: is white noise. --, therefor.

Signed and Sealed this
Fourteenth Day of June, 2016

Michelle K. Lee
*Director of the United States Patent and Trademark Office*

CERTIFICATE OF CORRECTION (continued)

U.S. Pat. No. 9,237,532 B2

In the specification

In Column 7, Line 18, delete "RSRP=$P_{RS}$-$g_{gl}$ [dBm]" and insert -- $RSRP = P_{RS} - g_{DL} \, [dBm]$ --, therefor.

In Column 7, Line 25, delete "power" and insert -- power. --, therefor.

In Column 7, Line 45, delete "(δ)" and insert -- (δ). --, therefor.

In Column 7, Line 55, delete "a E-UTRAN" and insert -- an E-UTRAN --, therefor.

In Column 8, Line 15, delete "X2" and insert -- X2. --, therefor.

In Column 9, in Table 2, Under "Purpose", Line 1, delete "contruction" and insert -- construction --, therefor.